United States Patent Office 3,068,257
Patented Dec. 11, 1962

3,068,257
POLYENE COMPOUNDS
Roland Entschel, Basel, and Paul Karrer, Zurich, Switzerland, assignors to Hoffmann-La Roche Inc., Nutley, N.J., a corporation of New Jersey
No Drawing. Filed Oct. 21, 1960, Ser. No. 63,957
Claims priority, application Switzerland Oct. 30, 1959
17 Claims. (Cl. 260—413)

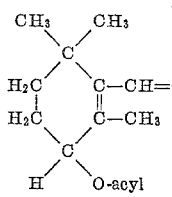
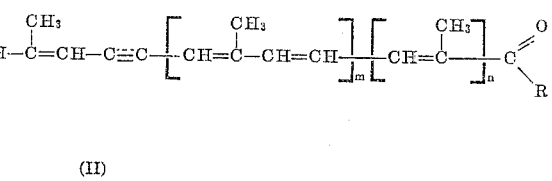

(II)

This invention relates to polyene compounds and to a method for producing such compounds. More particularly, this invention relates to polyene aldehydes and polyene carboxylic acids containing 25 to 40 carbon atoms.

According to this invention, a polyene compound having the structural formula

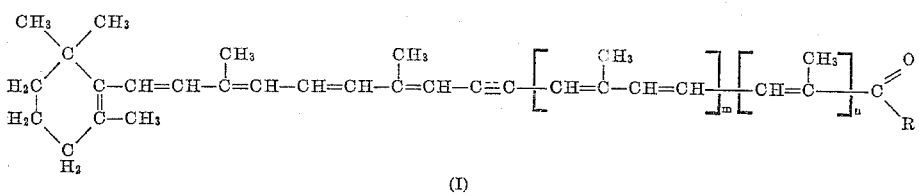

(I)

is treated with N-bromosuccinimide in the presence of an organic acid, the reaction product is saponified with alkali and then treated with an agent splitting off one molecule of water.

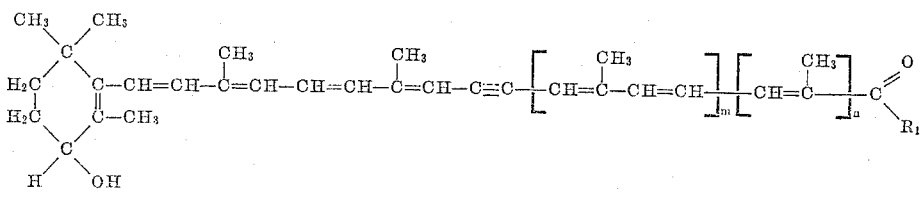

)III)

The symbol R in Formula I represents hydrogen, hydoxy or an alkoxy group. The symbol $m$ represents an integer from 0 to 3 and $n$ represents an integer from 0 to 1, the sum of $m$ and $n$ being equal to at least 1, i.e. the sum of $m$ and $n$ totals 1 to 4. The dotted line in Formula I indicates the presence of a triple bond or, in the alternative, there may be a double bond, in which case there is a hydrogen atom attached to each of the carbons in place of the third carbon-to-carbon bond. The alkoxy groups represented by R are preferably lower alkoxy groups such as methoxy, ethoxy, propoxy and the like.

The treatment of the polyene compound of Formula I with N-bromosuccinimide is effected in the presence of an organic acid, for example, lower fatty (alkanoic) acids such as acetic acid, propionic acid, formic acid and the like or aralkanoic acids, e.g. phenyl lower alkanoic acids such as benzoic acid, etc. The reaction is best carried out in an organic solvent, preferably a polar solvent such as a halogenated hydrocarbon, for example, chloroform, methylene chloride, dichloroethane, etc. It is advantageous to maintain a low temperature, preferably under 0°. A short period after initiation of the reaction, e.g. about ½ minute, it is desirable to add a tertiary base, for example, N-ethylmorpholine, N-ethylpiperidine, triethylamine or the like, to neutralize the resulting hydrogen bromide and eventually the excess organic acid. This reaction results in the formation of an ester having the structural formula R, $m$, $n$ have the same significance as in Formula I. The acyl group corresponds to that in the organic acid added to the reaction mixture.

The ester of Formula II is then, in a second reaction step, saponified with alkali, preferably alcoholic alkali solution, such as methanolic potassium hydroxide solution, while warming slightly, for example at about 50° C. The reaction product may be purified by conventional methods, e.g. by partition between solvents, chromatography, etc. The product of the saponification reaction has the structural formula $R_1$ in Formula III represents hydrogen or hydroxy and $m$ and $n$ have the same significance as in Formula I.

The saponification product of Formula III may, in an additional step of the process, be treated with an agent splitting off water, for example, a dilute mineral acid such as hydrochloric acid or the like. This step may be carried out in an inert organic solvent such as chloroform. This step of splitting off water results in compounds having the structural Formula III but with the ring system (IV)

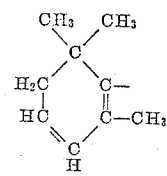

The compounds of this invention are crystalline, yellow, red or violet-red-colored compounds. They are useful as coloring agents and may be used in foods or feeds, particularly poultry feeds for the intensification of the color of the egg yolk or for pigmenting skin, shank, bill, fat or meat. They may also be used in cosmetics.

The examples which follow serve to illustrate the invention. Temperatures are expressed on the centigrade scale.

*Example 1*

500 mg. of 17-(2,6,6-trimethyl-1-cyclohexen-1-yl)-2,6,11,15 - tetramethyl - 2,4,6,8,10,12,14,16 - heptadecaoctaen-1-al [Helv. Chim. Acta 42, 854 (1959)] were dissolved in 500 ml. of pure chloroform. A solution of 215 mg. of N-bromosuccinimide and 1.5 ml. of glacial acetic acid in 50 ml. of pure chloroform were added to the solution at −18° under nitrogen, 30 seconds later 4 g. of N-ethylmorpholine were added. The temperature of the reaction mixture was allowed to rise to room temperature. It was then diluted with petroleum ether, washed with 0.1 N hydrochloric acid and then with water. The solvent was evaporated in vacuo and the residue was taken up in ether. The ether solution was mixed with 15% methanolic potassium hydroxide solution, allowed to stand at room temperature for 30 minutes, diluted with ether, washed neutral with water and the solvent was evaporated in vacuo. The residue, 17-(2,6,6-trimethyl-3-hydroxy - 1 - cyclohexen - 1 - yl) - 2,6,11,15-tetramethyl-2,4,6,8,10,12,14,16 - heptadecaoctaen - 1 - al, was crystallized from ether, M.P. 154°; absorption maxima in hexane at 154 m$\mu$ ($E$=115,800) and 480 m$\mu$ ($E$=94,400); readily soluble in methylene chloride and less soluble in ether, carbon tetrachloride and ethanol.

100 mg. of the aldehyde obtained above were dissolved in 50 ml. of chloroform and 6 ml. of a chloroform solution of hydrogen chloride (0.027 N in HCl) were added. After three hours the mixture was washed with aqueous bicarbonate solution and washed neutral with water. The chloroform was then evaporated off and the residue was chromatographed on a zinc carbonate column from a benzene-petroleum ether mixture. 17-(2,6,6-trimethyl-1,3 - cyclohexadien - 1 - yl) - 2,6,11,15 - tetramethyl - 2,4,6,8,10,12,14,16-heptadecaoctaen-1-al was isolated from the dark red-colored main band and crystallized by the addition of petroleum ether. After recrystallization from ether-petroleum ether, the product melted at 147–148°; absorption maximum in hexane at 462 m$\mu$ ($E$=120,500); readily soluble in methylene chloride and benzene, fairly soluble in ether, chloroform and carbon tetrachloride, and slightly soluble in methanol.

*Example 2*

500 mg. of 17-(2,6,6-trimethyl-1-cyclohexen-1-yl)-2,6,11,15 - tetramethyl - 2,4,6,8,10,12,14,16-heptadecaoctaen-1-oic acid methyl ester [Helv. Chim. Acta 42, 864 (1959)] in 50 ml. of pure chloroform were combined with a solution of 201 mg. of N-bromosuccinimide and 1.5 ml. of glacial acetic acid in 50 ml. of pure chloroform at −18° under nitrogen. After 30 seconds, 4 g. of N-ethylmorpholine were added to the reaction mixture and the temperature of the reaction mixture was allowed to rise to room temperature. The mixture was diluted with petroleum ether, washed with 0.1 N hydrochloric acid and then with water and the solvent was evaporated. The residue was taken up in a small amount of ether, mixed with a 15% methanolic potassium hydroxide solution and allowed to stand for 12 hours at room temperature. It was then diluted with ether and acidified with acetic acid. The solution was washed neutral with water, the solvent was evaporated in vacuo and the residue was crystallized from a mixture of benzene-methanol-ether. The crystalline product, 17-(2,6,6-trimethyl-3-hydroxy-1-cyclohexen-1 - yl) - 2,6,11,15 - tetramethyl - 2,4,6,8,10,12,14,16-heptadecaoctaen-1-oic acid melted at 190–191°; absorption maxima at 445.5 m$\mu$ ($E$=116,700) and 470 m$\mu$ ($E$=97,200); soluble in hot benzene and alcohol, slightly soluble in the cold solvents. The sodium and potassium salts of the acid are very slightly soluble in water but may be crystallized from alcohol, preferably with the addition of ether.

80 mg. of the acid obtained above were dissolved in 40 ml. of chloroform and 4 ml. of a chloroform solution containing hydrogen chloride were added. The solution was allowed to stand at room temperature for four hours. It was then washed neutral with aqueous sodium bicarbonate solution, the solvent was evaporated and the residue was made to crystallize from methanol at a low temperature. The product, 17-(2,6,6-trimethyl-1,3-cyclohexadien - 1 - yl) - 2,6,11,15 - tetramethyl - 2,4,6,8,10,12,14,16-heptadecaoctaen-1-oic acid, melted at 193–194°; U.V. absorption maximum in hexanedichloromethane at 454 m$\mu$ ($E$=101,000); difficultly soluble in most known solvents, rather readily soluble in a warm mixture of benzene and methanol.

*Example 3*

By using 17-(2,6,6-trimethyl-1-cyclohexen-1-yl)-2,6,11,15 - tetramethyl - 2,4,6,10,12,14,16 - heptadecaheptaen-8-yn-1-al [Helv. Chim. Acta 42, 854 (1959)] instead of 17 - (2,6,6 - trimethyl - 1 - cyclohexen - 1 - yl) - 2,6,11,15-tetramethyl - 2,4,6,8,10,12,14,16 - heptadecaoctaen-1-al in the procedure of Example 1, 17-(2,6,6-trimethyl-3-hydroxy - 1 - cyclohexen - 1 - yl)-2,6,11,15-tetramethyl-2,4,6,10,12,14,16-heptadecaheptaen-8-yn-1-al was obtained, M.P. 161–163°; absorption maximum at 430 m$\mu$ ($E$=82,500); readily soluble in benzene, methylene chloride and chloroform, less soluble in methanol, soluble in only small amounts of petroleum ether.

By treating the compound obtained above with a chloroform solution containing hydrogen chloride according to the procedure described in Example 1, 17-(2,6,6-trimethyl-1,3 - cyclohexadien - 1 - yl) - 2,6,11,15 - tetramethyl - 2,4,6,10,12,14,16-heptadecaheptaen-8-yn-1-al was obtained, M.P. 130–132°; absorption maximum in hexane at 440 m$\mu$ ($E$=87,200); readily soluble in benzene, methylene chloride and chloroform, slightly soluble in methanol.

*Example 4*

1.5 g. of 17-(2,6,6-trimethyl-1-cyclohexen-1-yl)-2,6,11,15 - tetramethyl - 2,4,6,10,12,14,16 - heptadecaheptaen-8-yn-1-oic acid methyl ester [Helv. Chim. Acta 42, 864 (1959)] were reacted with 606 mg. of N-bromosuccinimide and 4.5 ml. of glacial acetic acid in a chloroform solution according to the procedure described in Example 2. After evaporating the solvent, 17-(2,6,6-trimethyl - 3 - acetoxy - 1 - cyclohexen - 1 - yl) - 2,6,11,15-tetramethyl-2,4,6,10,12,14,16-heptadecaheptaen - 8 - yn-1-oic acid methyl ester was obtained which melted at 124–125° after recrystallizing from ether-petroleum ether.

The compound obtained above was treated in ether solution with methanolic potassium hydroxide solution by the procedure described in Example 2. After 24 hours, the ether solution was washed with water and the solvent was evaporated. The residual, crude 17-(2,6,6-trimethyl-3 - hydroxy - 1 - cyclohexen - 1 - yl) - 2,6,11,15 - tetramethyl - 2,4,6,10,12,14,16 - heptadecaheptaen - 8 - yn - 1-oic acid was recrystallized from a mixture of benzene, methanol and petroleum ether and melted at 199–201°; absorption maximum at 423 m$\mu$ ($E$=85,500).

By treating the above compound with a chloroform solution containing hydrogen chloride according to the procedure of Example 2, 17-(2,6,6-trimethyl-1,3-cyclohexadien - 1 - yl) - 2,6,11,15 - tetramethyl - 2,4,6,10,12,14,16-heptadecaheptaen-8-yn-1-oic acid was obtained in the form of crystals melting at 207°; absorption maximum 429 m$\mu$ ($E$=87,000).

3,066,257

We claim:

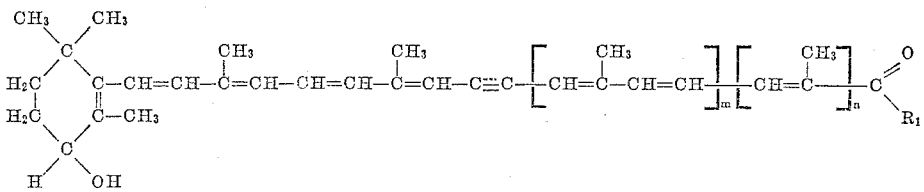

1. A process for the production of a compound of the formula

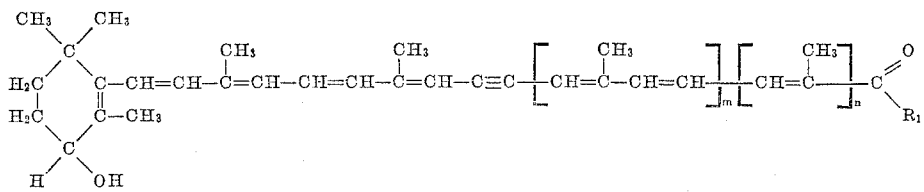

wherein $R_1$ represents a member of the group consisting of hydrogen and hydroxy, $m$ represents an integer from 0 to 3, $n$ represents an integer from 0 to 1 and the sum of $m$ plus $n$ is at least 1, which comprises reacting a compound of the formula

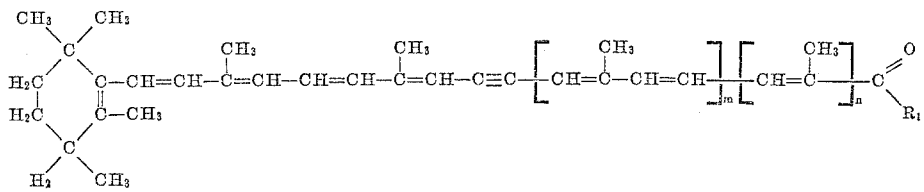

wherein R represents a member of the group consisting of hydrogen, hydroxy and lower alkoxy and $m$ and $n$ have the same significance as above, with N-bromosuccinimide in the presence of an organic carboxylic acid and saponifying the reaction product with alkali.

2. A process according to claim 1 wherein the organic carboxylic acid is acetic acid.

3. A process according to claim 1 wherein a tertiary organic base is added to the reaction mixture shortly after the addition of the N-bromosuccinimide.

4. A process according to claim 3 wherein the tertiary organic base is N-ethylmorpholine.

5. A process according to claim 1 wherein the reaction is effected in the presence of a polar organic solvent.

6. A process according to claim 5 wherein the polar organic solvent is a halogenated hydrocarbon.

7. A process according to claim 1 wherein the saponification is effected by means of methanolic potassium hydroxide solution.

8. A process according to claim 1 wherein the product is reacted with mineral acid and water is split off to produce a compound of the formula

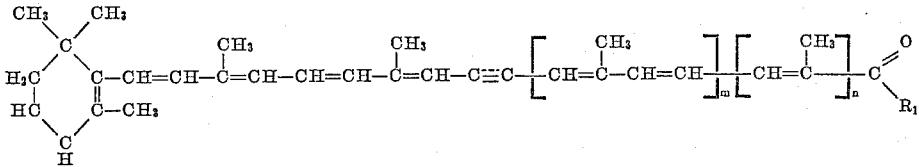

wherein $R_1$, $m$ and $n$ have the same significance as in claim 1.

9. A compound of the formula

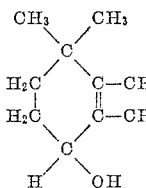

wherein $R_1$ represents a member of the group consisting of hydrogen and hydroxy, $m$ represents an integer from 0 to 3, $n$ represents an integer from 0 to 1 and the sum of $m$ plus $n$ is at least 1.

10. 17-(2,6,6-trimethyl-3-hydroxy-1-cyclohexen-1-yl)-2,6,11,15-tetramethyl-2,4,6,8,10,12,14,16 - heptadecaoctaen-1-al.

11. 17-2,6,6-trimethyl-1,3-cyclohexadiene-1-yl) - 2,6,11,15-tetramethyl-2,4,6,8,10,12,14,16-heptadecaoctaen-1-al.

12. 17-(2,6,6-trimethyl-3-hydroxy-1-cyclohexen-1-yl)-2,6,11,15-tetramethyl-2,4,6,10,12,14,16-heptadecaheptaen-8-yn-1-al.

13. 17-(2,6,6-trimethyl-1,3-cyclohexadien-1-yl)-2,6,11,15-tetramethyl-2,4,6,10,12,14,16-heptadecaheptaen-8-yn-1-al.

14. 17-(2,6,6-trimethyl-3-hydroxy-1-cyclohexen-1-yl)-2,6,11,15-tetramethyl-2,4,6,8,10,12,14,16 - heptadecaoctaen-1-oic acid.

15. 17-(2,6,6-trimethyl-1,3-cyclohexadien-1-yl)-2,6,11,15 - tetramethyl-2,4,6,8,10,12,14,16-heptadecaoctaen-1-oic acid.

16. 17-(2,6,6-trimethyl-3-hydroxy-1-cyclohexen-1-yl)-2,6,11,15-tetramethyl-2,4,6,10,12,14,16-heptadecaheptaen-8-yn-1-oic acid.

17. 17-(2,6,6-trimethyl-1,3-cyclohexadien-1-yl)-2,6,11,15-tetramethyl-2,4,6,10,12,14,16-heptadecaheptaen-8-yn-1-oic acid.

References Cited in the file of this patent

Entschel et al.: Articles in Helvetica Chemica Acta (1958), vol. 41, pp. 402–413; 983–987. (QD 1H4 S.L.).

Karrer: Helvetica Chemica Acta, vol. 42, pp. 854–864 (1959).

Henbest et al.: Journal Chemical Society, London, 1955, pp. 2765–67.

UNITED STATES PATENT OFFICE
CERTIFICATE OF CORRECTION

Patent No. 3,068,257                      December 11, 1962

Roland Entschel et al.

It is hereby certified that error appears in the above numbered patent requiring correction and that the said Letters Patent should read as corrected below.

Columns 5 and 6, lines 24 to 33, for the lower left-hand portion of the formula reading:

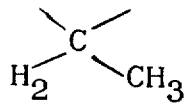      read     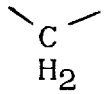

same formula, for the extreme right-hand portion of the formula reading:

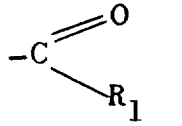     read     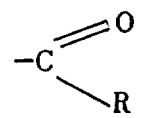

column 6, line 34, for "17-2, 6,6-" read -- 17-(2,6,6- --; same line 34, for "cyclohexadiene" read -- cyclohexadien --.

Signed and sealed this 8th day of October 1963.

(SEAL)
Attest:

ERNEST W. SWIDER

EDWIN L. REYNOLDS
Acting Commissioner of Patents